(12) United States Patent
Park

(10) Patent No.: US 12,032,889 B2
(45) Date of Patent: Jul. 9, 2024

(54) FAST EFFECTIVE RESISTANCE ESTIMATION USING MACHINE LEARNING REGRESSION ALGORITHMS

(71) Applicant: Synopsys, Inc., Mountain View, CA (US)

(72) Inventor: Jong Beom Park, Mountain View, CA (US)

(73) Assignee: Synopsys, Inc., Sunnyvale, CA (US)

( * ) Notice: Subject to any disclaimer, the term of this patent is extended or adjusted under 35 U.S.C. 154(b) by 469 days.

(21) Appl. No.: 17/190,336

(22) Filed: Mar. 2, 2021

(65) Prior Publication Data

US 2021/0271994 A1 Sep. 2, 2021

Related U.S. Application Data

(60) Provisional application No. 62/984,213, filed on Mar. 2, 2020.

(51) Int. Cl.
| | | |
|---|---|---|
| *G06F 30/36* | (2020.01) | |
| *G06F 18/23213* | (2023.01) | |
| *G06F 30/373* | (2020.01) | |
| *G06F 30/39* | (2020.01) | |
| *G06N 7/00* | (2023.01) | |
| *G06N 20/10* | (2019.01) | |
| *G06F 119/06* | (2020.01) | |
| *G06N 20/00* | (2019.01) | |

(52) U.S. Cl.
CPC ............ *G06F 30/36* (2020.01); *G06F 30/373* (2020.01); *G06F 30/39* (2020.01); *G05B 2219/45028* (2013.01); *G06F 18/23213* (2023.01); *G06F 2119/06* (2020.01); *G06N 7/00* (2013.01); *G06N 20/00* (2019.01); *G06N 20/10* (2019.01)

(58) Field of Classification Search
CPC ........ G06F 30/36; G06F 30/373; G06F 30/39; G06F 18/23213; G06F 2119/06; G06N 20/00; G06N 20/10; G06N 7/00; G05B 2219/45028
USPC ............................ 716/106, 111, 136; 703/14
See application file for complete search history.

(56) References Cited

U.S. PATENT DOCUMENTS

| | | | | |
|---|---|---|---|---|
| 11,022,634 B1* | 6/2021 | Lee | ................... | G01R 19/0084 |
| 11,308,253 B2* | 4/2022 | Zhu | ................... | G06F 30/392 |
| 11,475,293 B1* | 10/2022 | Pan | ................... | G06N 20/20 |
| 11,636,388 B1* | 4/2023 | Chan | ................... | G06F 30/398 |
| | | | | 716/129 |
| 2019/0034574 A1* | 1/2019 | Zhu | ................... | G06F 30/392 |
| 2022/0261526 A1* | 8/2022 | Zhu | ................... | G06F 30/392 |

\* cited by examiner

*Primary Examiner* — Phallaka Kik
(74) *Attorney, Agent, or Firm* — JAQUEZ LAND GREENHAUS & MCFARLAND LLP; Bruce W. Greenhaus, Esq.

(57) ABSTRACT

Various embodiments of a method and apparatus for estimating the effective resistance for the design of on-chip power nets are disclosed. Through sampled node resistance, performance of a power net can be determined on an entire chip. Effective resistance predictions can be made for all nodes. Through the resistance predictions, a designer can analyze the which areas would benefit from power and ground augmentation.

20 Claims, 12 Drawing Sheets

FAST EFFECTIVE RESISTANCE ESTIMATION USING MACHINE LEARNING REGRESSION ALGORITHMS

CROSS-REFERENCE TO RELATED APPLICATIONS—CLAIM OF PRIORITY

The present application claims priority to U.S. Provisional Application No. 62/984,213, filed Mar. 2, 2020, entitled "Fast Effective Resistance Estimation using Machine Learning Regression Algorithms", which is herein incorporated by reference in its entirety.

TECHNICAL FIELD

This disclosure relates to the field of electronic design automation in general, including the following topics: estimating the effective resistance for design of on-chip power networks.

BACKGROUND

Designing an on-chip power network (hereafter "power net") for a complex circuit design (such as the design of a VLSI integrated circuit (IC) design) is becoming more challenging as power supply levels are being reduced and the size of the components on these ICs shrink, resulting in more performance being packed into a smaller area. In addition, having a robust power net under these conditions is becoming more critical. An increase in the importance of the power net is in large part due to the fact that the performance of individual circuit blocks throughout the design is more dependent on the power net. In order to provide a robust power net, it is necessary to determine several operational factors. One such factor is the average power and current required by various circuit blocks within a complex design. Another factor is the voltage drop across critical points within the design (e.g., at nodes on the power net). These operational factors typically depend on the localized power demands of circuit blocks throughout the design. Thus, analyzing the voltage drop at arbitrary nodes on a power net has become a crucial part of the chip design process. The voltage drop at a node within the power net depends on the effective resistance presented to the voltage source and the current loads for the node. Thus, for a chip designer, knowing the effective resistance at nodes within the power net in the early design stage of the design process can significantly reduce and avoid problems that might otherwise occur due to weaknesses or failures in the design of the power net.

Accordingly, it would be advantageous to provide a method and apparatus that can quickly, inexpensively and reliably predict a rough estimate of the voltage drop that will be present at various nodes in an IC design.

SUMMARY

In the early design stage, it is desirable to be able to quickly predict which part of the design would be a problem rather than have precise values that take a long time to calculate. The disclosed method and apparatus resolves both the effective resistance at particular nodes and the voltage drops at various nodes in the design. In some embodiments, machine learning assists in the resolution. The power network (power net) designer can use not only the entire power net, but also various information related to nodes within the power net. The disclosed method and apparatus returns an estimate of effective resistance faster than previous methods that rely on solving a matrix. The returned estimation allows a designer to quickly set or change the direction in which the chip design heads.

In some embodiments in which machine learning is used, a machine learning engine is trained using samples of some of the nodes on the chip. The effective resistance is then calculated for the sampled nodes. In addition, various pieces of information related to the node (such as the number of vias around the node, the minimum path resistance, the power net name, etc.) are collected. The sampled nodes are classified based on the effective resistance and minimum path resistance values that have been collected. In some embodiments, regression machine learning models are trained to distinguish classes using the collected information. After training, when it is desireable for the designer to predict the effective resistance to an arbitrary node on the power net, the designer can quickly receive the class of the node, based on the trained model. The designer can predict the effective resistance of the node, based on the statistical characteristics of each class, such as the mean value and the variance.

By attaining the sampled node resistance, the power net performance can be characterized for the entire chip. In some embodiments, the effective resistance predictions of all nodes is obtained through a machine learning engine. In some embodiments, the resistance prediction can provide the designer with the ability to analyze the areas that require power and ground augmentation.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

Figure 1A:
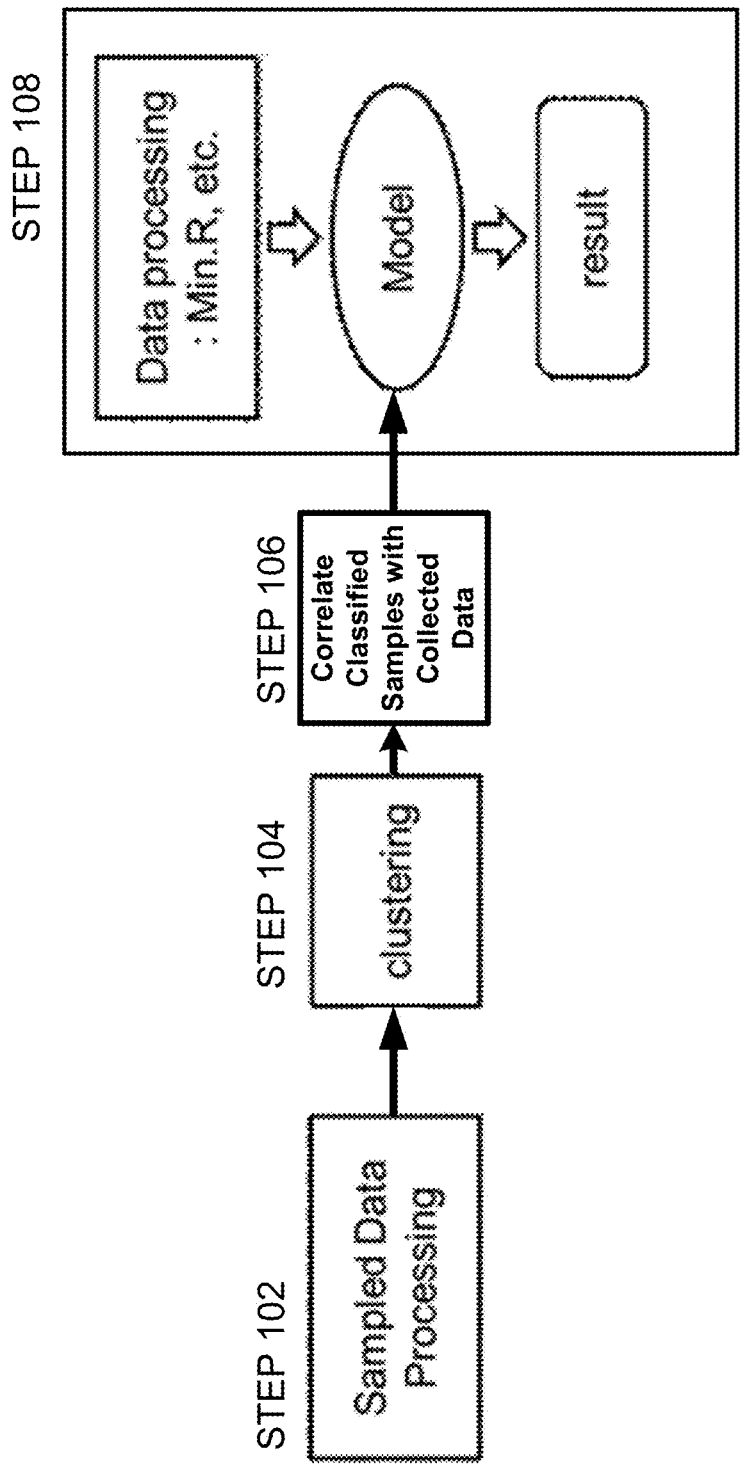
FIG. 1A is a simplified flow chart providing an overview of a process performed in accordance with some embodiments of a presently disclosed method and apparatus.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

A closed-form expression for calculating the effective resistance of a single layer power mesh can be helpful when designing integrated circuits (ICs). The effective resistance is the resistance from the associated node to the reference potential, taking all paths between the associated node and the reference potential into account. Typically, there may be several parallel paths between these two points. In addition, a closed-form expression for calculating the resistance of two-layer, nonisotropic meshes with different vertical and horizontal unit resistance is also helpful. However, those expressions are typically based on models that assume ideal power grids. Unfortunately, ICs generally have a locally uniform, but globally non-uniform power mesh structure in which top-level metal layers having a mesh structure, are connected to the package that houses the IC and to the individual circuits through vias. This structure results in errors when using a module based on the assumption of ideal power grids.

In accordance with one method for designing an IC, calculating the effective resistance of a complex circuit requires the use of time consuming and expensive matrix calculations. Typically, to obtain the effective resistance of a complex circuit, the power network (power net) is modeled as a linear system using a conductance matrix. The power net is the set of electrically interconnected conductors used throughout the IC to distribute power to the components within the IC. The use of such a conductance matrix results in significant computational complexity. For example, when the power net is composed of N rows of conductors that intersect with N columns of conductors, the total number of nodes at those intersections (i.e., the "node size") is $N^2$, and the conductance matrix to solve for this power net is $N^2 \times N^2$. Doing such calculations on the entire matrix is typically a computationally expensive way to analyze the voltage drop in the early stage of the design. Therefore, an alternative method would be desirable to reduce the complexity required to identify the voltage drop at various nodes in the design.

This is particularly true in the early design stage of an IC, at which time it is essential to be able to obtain a quick prediction that can identify which part of the design is likely to be a problem, rather than relying on calculations of precise values that take a long time to attain. Solutions currently [currently] being used make it difficult to obtain a quick prediction. This can make it difficult to respond in an agile manner to potential problems in the initial design, because if it takes too long to perform the calculations required to attain an understanding of the elements of the design that are likely to be problematic, it may be difficult to alter the design in response to such calculations.

FIG. 1A is a simplified flow chart providing an overview of a process performed in accordance with some embodiments of a presently disclosed method and apparatus. Initially, sampled data is processed (STEP 102). The sample data comprises information that is statistically relevant to the effective resistance between each sample node and a reference potential tap, such as a power supply tap. Accordingly, the sample data can be used to characterize the subset of sample nodes.

Once the sample data has been attained and processed, the processed sample data is used to identify clusters of nodes (STEP 104). A "cluster of nodes" is a subset of the sample nodes that have characteristics that fall within a predetermined range. In some embodiments, clusters are formed based on a ratio of effective resistance with respect to minimum path resistance for each sample node, where the ratio associated with each sample node in the cluster is within a predetermined range. The minimum path resistance is the resistance on one particular path, where that particular path is the path having the least resistance between the associated node and a reference potential, such as ground or a power supply tap point. The minimum path resistance is an upper bound on the effective resistance of a node to the reference potential. That is, all other paths from the associated node to the reference potential will be in parallel with the particular path identified as having the minimum path resistance. Each of the other paths will contribute to reducing the effective resistance between the node and the reference potential. If there is only one path, then minimum path resistance is equal to the effective resistance value from the node to the reference potential. In the case in which there are two or more parallel paths, the effective resistance will be less than the minimum path resistance. Sample nodes within a cluster are then classified based on their membership in a particular cluster.

Upon classifying each sample node, the full set of sample data associated with sample nodes in a class is correlated with the sample data for the other sample nodes of that class to determine patterns and common "markers" in the sample data that can be used to indicate that a particular node belongs in that class (STEP 106).

Once the correlation of the sample data for all of the nodes in all of the classes has been performed and indicia (the patterns and common markers) determined, the indicia form a "model". The model can be used to classify other nodes of the power net that are not sample nodes by applying data associated with these other nodes to the model (STEP 108).

Processing the sampled data includes identifying a subset of N sample nodes from among all the nodes on a power net. In some embodiments, the number of sample nodes is a relatively small fraction of the total number of nodes. However, the number of sample nodes is preferably a statistically significant number to ensure that the results are within a desired range of accuracy. In some embodiments, attention is paid to the selection of the sample nodes. The selected sample nodes should be an appropriate representative sample of the set of all nodes of the power net. In addition, sample nodes should be selected such that for each, it should be possible to calculate a minimum path resistance from the sample node to a reference potential and the effective resistance between the sample node and the reference potential.

As a part of the sampled data processing step, the minimum path resistance and the effective resistance associated with each of the N sample nodes in the subset are determined.

Figure 1B:
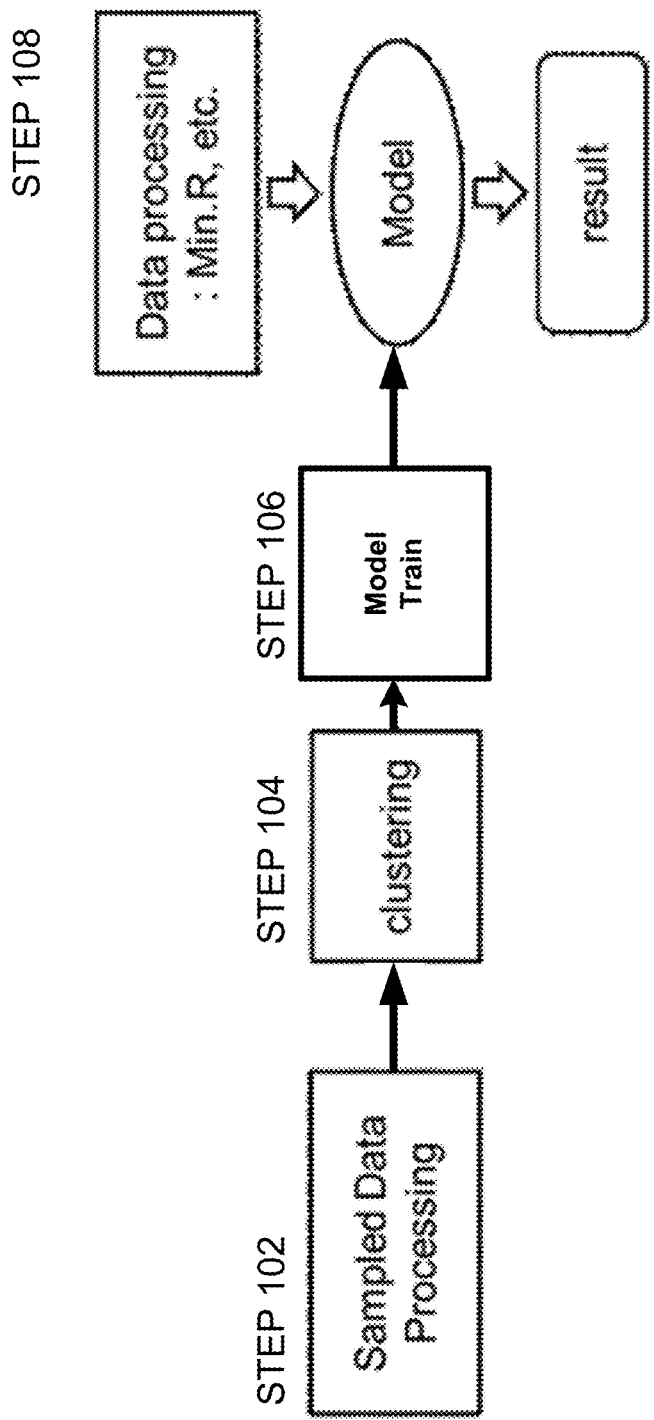
FIG. 1B is a simplified flow chart of an alternative process in which a machine learning module, such as a regression model, is trained to identify the indicia that is used and to output a result based on the input data provided to the model for a set of nodes of the power net other than the sample nodes.

FIG. 1B is a simplified flow chart of an alternative process in which a machine learning module, such as a regression model, is trained to identify the indicia that is used and to output a result based on the input data provided to the model for a set of nodes of the power net other than the sample nodes. In other embodiments, other types of machine learning (ML) engines and/or artificial intelligence (AI) engines are trained on the processed sample data and can then be used to output a result that indicates the class in which a particular node having particular processed sample data should be a member. Based on the particular class, an estimate of the effective resistance of the node can be determined. Alternatively, in some embodiments, the result that is directly output from the ML or AI engine is an estimate of the effective resistance between the node and a reference potential.

Figures 2A, 2B:
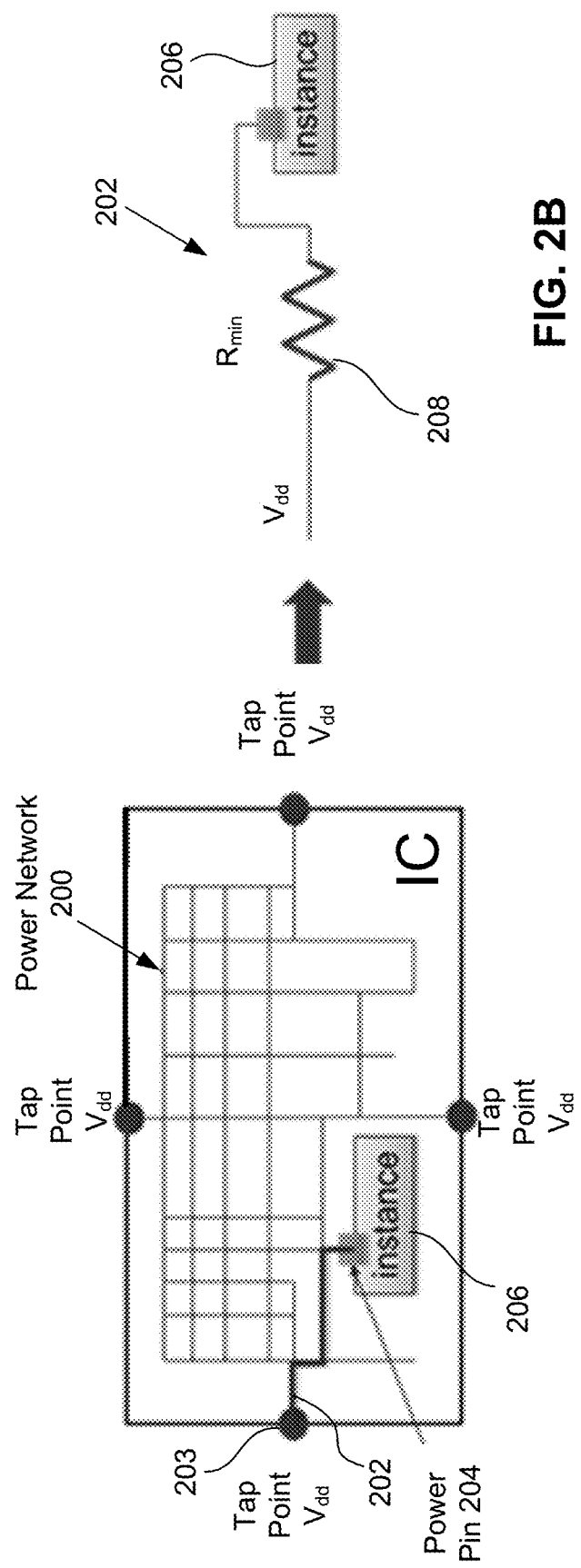
FIG. 2A is an illustration of a simplified model of an on-chip power net.
FIG. 2B is a simplified model of the path having a path resistance of $R_{min}$.

FIG. 2A is an illustration of a simplified model of an on-chip power net 200. The shortest path 202 (shown with a heavier line width) from a power supply tap point 203 to a particular node, such as a power pin 204 of an "instance" 206 is highlighted. In some embodiments, the instance 206 is an active circuit block (i.e., a block that requires power). Calculating the resistance from the supply tap point 203 to the power pin 204 along this path 202 provides the minimum path resistance between these two points.

FIG. 2B is a simplified model of the path 202 having a path resistance 208 of $R_{min}$. Due to the simplicity of this path 202 with respect to the more complex web of paths associated with the composite of all paths between the power supply $V_{dd}$ and the power pin 204, the minimum path resistance can be calculated significantly faster than the effective resistance from the power pin 204 to the power supply tap point 203, which requires more complex computation. Other sample data can also be attained relatively simply.

Data Processing

TABLE 1 provides a list of parameters used as sample data in accordance with the disclosed method. It should be noted that this list is provided as an example of the parameters that can be used as sample data and that might be of value in estimating the effective resistance from a node (e.g., a power pin) on a power net of an IC to ground or a source of a power supply reference potential.

TABLE 1

| Item | Parameter name | Note |
| --- | --- | --- |
| 1 | Num. of same power ground nets | The Number of same power net shape around 1 um² from the pin. This value includes all-metal layer. |
| 2 | Num. of via around | The number of same power net via around 1 um² from the pin. This value includes all via layer. |
| 3 | Name of power net | Name of the power net of the pin. i.e., vdd, vss, etc. |
| 4 | Is boundary cell pin | True for the pin belongs to the boundary cell. |
| 5 | Min. via distance | The distance from the pin to the nearest via which connects to the upper metal layer. |
| 6 | Num. of via in same direction within 8 um | The number of the vias which connect the power pin to the upper metal layer with the same power rail direction. For example, if the direction of the power rail is horizontal, then count the |

TABLE 1-continued

| Item | Parameter name | Note |
| --- | --- | --- |
|  |  | number of vias within 4 um to the left and 4 um to the right. |
| 7 | Min.R | Minimum path resistance of the pin. This is upper bound of the effective resistance. |
| 8 | $\ln(D2^2)$ | Distance related. |
| 9 | $\ln(D1^2) + \ln(D2^2)$ | Distance related. |
| 10 | $Min.R/\ln(D1^2 + D2^2)$ | Distance related. |
| 11 | $Min.R/\ln(D1 + D2)$ | Distance related. |
| 12 | $Min.R/(\ln(D1^2) + D2)$ | Distance related. |
| 13 | $Min.R/(\ln(D1^2) + \ln(D2^2))$ | Distance related. |
| 14 | Class | Class resulting from clustering. |

Items 1 through 7 provide an estimation of the complexity of the paths between a particular node on the power net (i.e., a particular power/ground (PG) pin) and a power source or ground. A power net name associated with each target node (Item 3) and information related to the power net within a specific area (Item 1, 2 and 4-6) are collected.

More particularly, item 1 is the number of conductors around 1 um² from the target node (i.e., the node of interest) that are connected to a power source. This value includes conductors formed on all of the metal layers of the IC.

Item 2 is the number of same power net vias that reside within 1 um2 of the target node. This value includes all of the vias independent of the particular layers connected by the vias.

Item 3 is the name of the power net in which the node resides (i.e., vdd, vss, etc.).

Item 4 is a logical value that is equal to 1 (i.e., true) if the node belongs to a boundary cell. As the name implies, a boundary cell is a cell that resides at the edge (or near a boundary) of a cell. Boundary cells have unique characteristics that make them interesting for the purposes of the disclosed method.

Item 5 is the distance from the target node to the nearest via that connects to the upper metal layer.

Item 6 is the number of the vias that connect the target node to an upper metal layer on the same power rail. For example, the closest via from a conductor electrically coupled to the target node is followed to a power rail. Then, the number of vias within 4 um in one direction down the power rail and 4 um in the other direction.

Item 7 is the minimum path resistance between the target node and a reference potential.

Item 8 is the logarithm of the square of a distance D2. The distance D2 is determined in the course of performing the data processing. The definition of D2 is provided below.

Item 9 is sum of the logarithm of the square of a distance D1 and the logarithm of the square of a distance D2. D1 is determined in the course of performing the data processing. The definition of D1 is provided below.

Item 10 is a ratio of the resistance of the minimum resistance path with respect to the logarithm of sum of the square of a distance D1 and square of the distance D2.

Item 11 is a ratio of the resistance of the minimum resistance path with respect to the logarithm of the sum of the distance D1 and the distance D2.

Item 12 is a ratio of the resistance of the minimum resistance path with respect to the logarithm of the sum of the square of the distance D1 and the distance D2.

Item 13 is a ratio of the resistance of the minimum resistance path with respect to the sum of the logarithm of the square of the distance D1 and the logarithm of the square of the distance D2.

Item 14 is the resulting class (i.e., the class of the target node) that is determined after the process of clustering perform in STEP 104 of FIG. 1.

As noted above, items 7 to 13 are related to the distance between the target node and a reference potential, such as circuit ground of the power supply. There is a correlation between the effective resistance between a target node a reference potential and the distance of the power supply tap point to the target node. This relationship informed by the fact that the effective resistance between two points, $N_1$ and $N_2$ can be estimated to be:

$$R_{n,m} = \frac{1}{2\pi}\ln(d^2) + 0.51469 \qquad \text{(Eq. 1)}$$

where:

d is the distance between the two points $N_1$ and $N_2$.

Accordingly, it is helpful to be able to estimate this distance, since this distance is directly proportional to the effective resistance. In order to estimate this distance, the structure of the power distribution structure used to distribute the power must be analyzed.

Figure 3A:
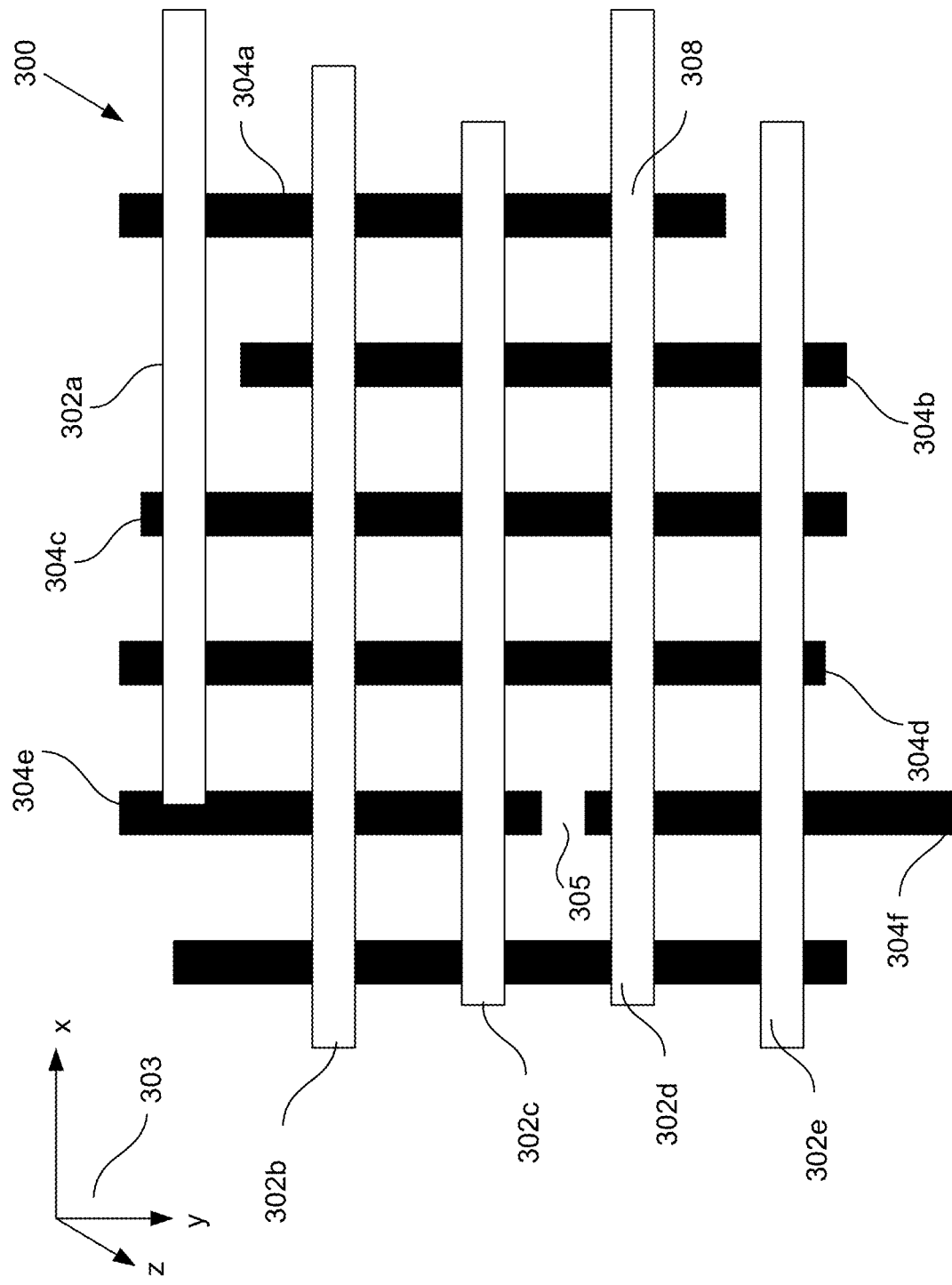
FIG. 3A is an illustration of a first and second layer of a set of power rails that taken together form a two-layer power mesh.

FIG. 3A is an illustration of a first and second layer of a set of power rails 302, 304 that taken together form a two-layer power mesh 300. The first set of x-power rails 302*a*, 302*b*, 302*c*, 302*d*, 302*e* is formed within a first metal layer. The x-power rails 302 run parallel to an x-axis (as noted by orientation arrows 303). It should be noted that throughout this disclosure, a reference string (such as "302*a*") used to identify a feature in a figure (such as a power rail), having a string of numeric characters followed by one or more alphabetic characters, identifies a feature of the figure that is similar to other features in the figures having the same numeric string of characters. For example, the power rail 302*a* is similar to the power rail 302*b*. Furthermore, a reference string having only the numeric string (i.e., lacking the alphabetic characters) refers collectively to all of the features having the same numeric string. For example, "power rail 302" refers collectively to all of the power rails 302*a*, 302*b*, 302*c*, etc.

A second set of y-power rails 304 formed in a second metal layer run parallel to a y-axis. The two-layer power mesh 300 provides a portion of the power distribution system in the IC. It should be understood that the power mesh 300 shown is a simplification and is not to scale. In a typical IC, a power mesh would have a large number of rails and would traverse the length and width of the IC.

All of the power rails 302, 304 formed on the same metal layer run in the same direction. In some embodiments, some rails 302, 304 extend further (i.e., are longer) than others formed on the same metal layer. In addition, in some embodiments, some of the rails 304*e*, 304*f* may be "interrupted" by a gap 305. In some embodiments, vias between the two metal layers electrically connect the x-power rails 302 and y-power rails 304. Since the x-power rails 302 are formed on a different metal layer than the y-power rails 304, there is no electrical connection between the x-power rails 302 and the y-power rails 304 other than through vias that connect the rails 302, 304 of each metal layer. The vias are not shown in FIG. 3A for the sake of simplicity. However, such vias would reside at one or more of the points 308 at which a y-power rail 304 crosses over an x-power rail 302.

Figure 3B:
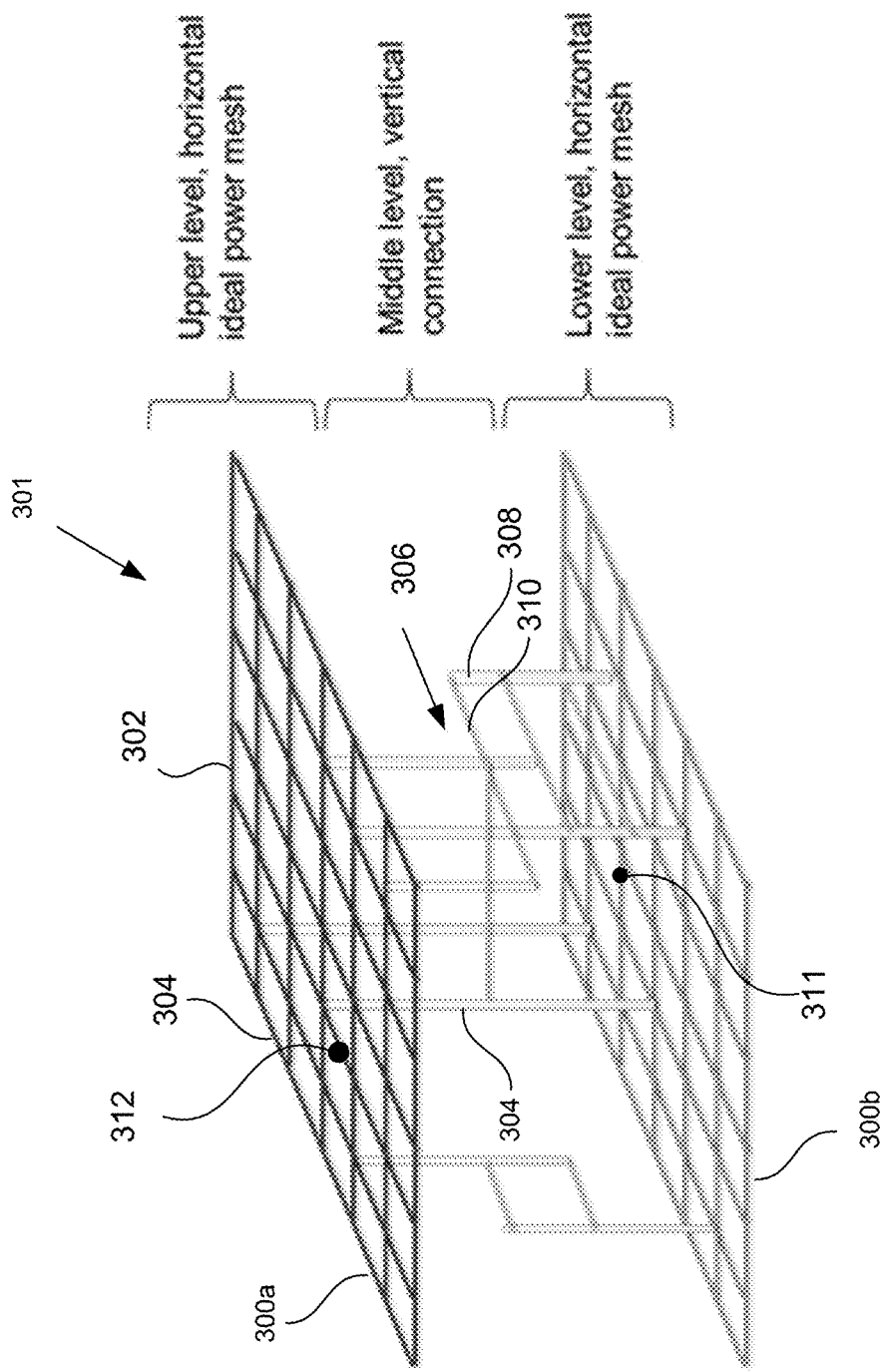
FIG. 3B is an illustration showing a typical structure in which a pair of two-layer power meshes are interconnected middle level, vertical connections in accordance with some embodiments of a modern chip design.

FIG. 3B is an illustration showing a typical structure 301 in which a pair of two-layer power meshes 300*a*, 300*b* are interconnected middle level, vertical connections 306 in accordance with some embodiments of a modern chip design. Each of the power meshes 300 comprise rails 302, 304 (see FIG. 3A) formed in a first metal layer and second metal layer, wherein the only electrical connections between the first and second metal layers of each set of rails 302, 304 is through vias between the two layers (as noted above with respect to FIG. 3A). In one embodiment of an IC with 13 metal layers (i.e., a first layer M0 to a thirteenth layer M12) there is typically at least a first 2-layer power mesh 300*a* formed of x-rails 302 and y-rails 304 in two of the metal layers between the eighth layer M7 and the thirteenth layer M12. In some such ICs, the middle metal layers (i.e., layer M2 to layer M6) are mainly used for signal routing. Pillars 304 formed using vias interconnect the two power meshes 300*a*, 300*b*. In addition, in some embodiments, the vias 308 and connections 310 formed in the middle metal layers M2 to M6 between the vias form a vertical mesh structure through the middle level, vertical connections 306. In addition, a second lower-level power mesh network 300*b* (similar to 2-layer power mesh 300*a* that is formed between the $8^{th}$ and $13^{th}$ layers) may be formed between the first metal layer M0 and third metal layer M2.

Figure 4:
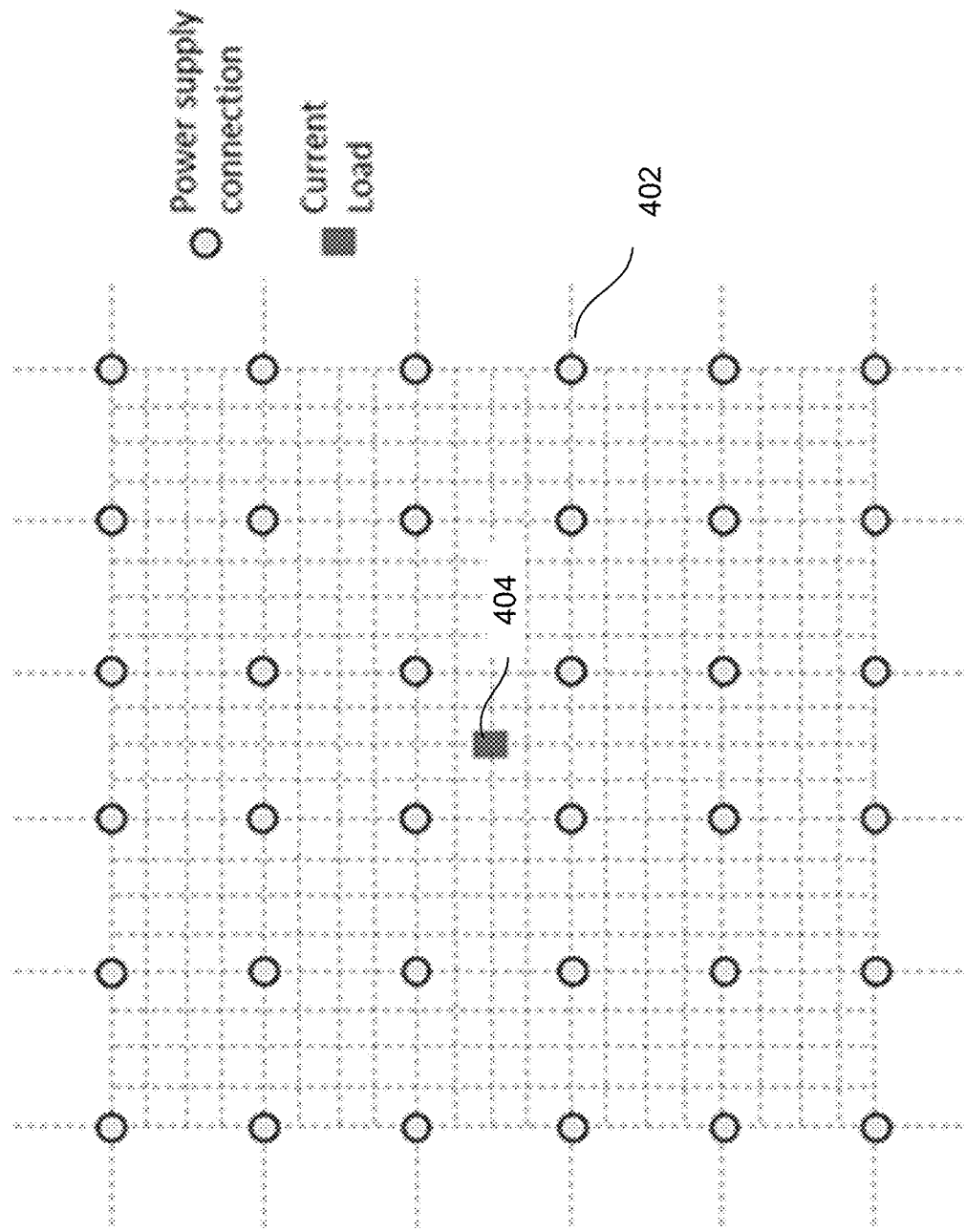
FIG. 4 is a generalized illustration of a plurality of points and a current load point that is placed in the middle of the points.

FIG. 4 is a generalized illustration of a plurality of points 402 and a current load point 404 that is placed in the middle of the points 402. Each of the points 402 represent a point through which it can be assumed current from the power tap points 402 flows to a particular node of interest. The current contribution of the nearest 4 points 402 to the current draw through the load point 404, when the load point 404 is in the middle of the power net can be estimated to be 60% of the current contribution, and 96% is from the 16 nearest points 402.

In accordance with some embodiments of the disclosed method and apparatus, each of the vertical connections through the vias 304 between the seventh metal layer M6 down to third metal layer M2 (i.e., through the middle level, vertical connections 306) can be understood to be similar to one of the points 402. Accordingly, a virtual power supply point V 311 (see FIG. 3B) can be assumed to be at a midpoint of the several vias (i.e., geographically centrally located). Current that is supplied to a node (such as a PG pin) at the lower layers of the IC can be assumed to be supplied consistent with the model shown in FIG. 4. That is, 60% of the current flows through the 4 vias 304 nearest the node and 96% of the current to the node flows through the 16 vias closest to the node.

A relative location of the virtual power supply point V 311 within the IC is expressed as an x and y coordinate relative to an origin (coordinate reference point at location x=0, y=0) in the IC. In addition, a point P 312 that is located in the middle of the plurality of power taps that are associated with the upper power mesh 300*a* and that are located closest to the target node. The power taps are points to which a wire bond or other such electrical connection is made to an outside power source. The location of the point P 312 is also expressed as an x and y coordinate relative to the origin in the IC. It should be noted that the illustration in FIG. 3B is not to scale and that the vertical distance (i.e., distance along the z-axis of the chip; see orientation arrows 303 in FIG. 3A) between the power mesh 300*a* and the power mesh 300*b* is far less than the distance between the point P 312 and the virtual power supply point V 311 on the x-y plane. Accordingly, the distance between the point P 312 and the virtual power supply point V 311 can be assumed to be only the difference between the location on the x-y plane. That is, the total distance D1 between the point P 312 located at $(x_1, y_1, z_1)$ and the virtual supply point V 311 located at $(x_2, y_2, z_2)$ can be assumed to be the square root of $[(x_1-x_2)^2+(y_1-y_2)^2]$. In addition, the distance D2 between the virtual power supply point V 311 and an associated node (i.e., a particular target pin) can be assumed to be the square root of $[(x_2-x_3)^2+(y_2-y_3)_2]$. with the target node located at $(x_3, y_3)$.

Figure 5:
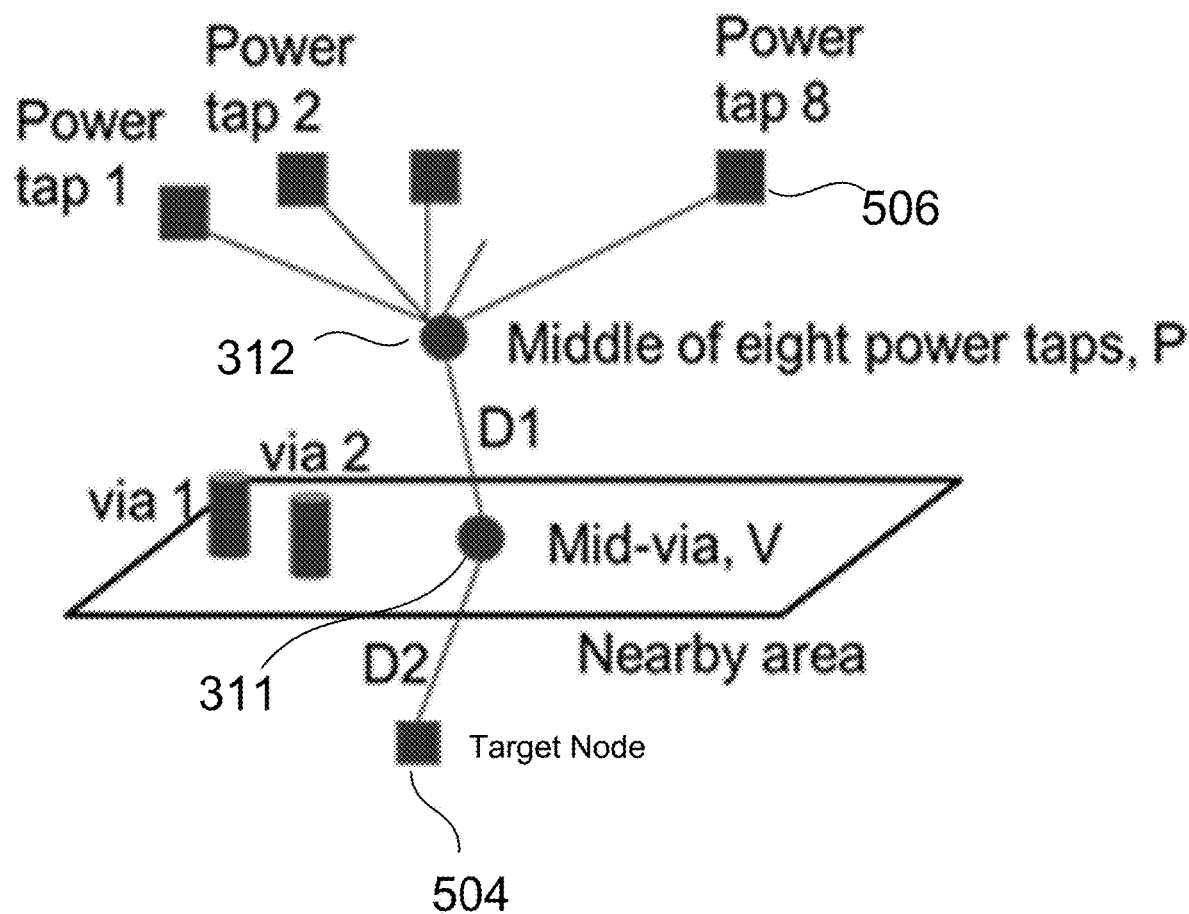
FIG. 5 is a conceptual diagram of the electrical path used to estimate the effective resistance of a target node with respect to a reference potential.

FIG. 5 is a conceptual diagram of the electrical path used to estimate the effective resistance of a target node with respect to a reference potential. As noted above, since the distance in the vertical (z) direction of the chip (i.e., height) is relatively short with respect to distance in the horizontal (x, y) direction, the 3-dimensional effect can be ignored (i.e., the analysis can be assumed to be in two dimensions). Therefore, the planar distance D2 on the x/y plane between virtual power supply point V 311 and the target node 504 is calculated as noted above. The distance D1 is also calculated from the point P 312 located in the middle of the plurality of power taps associated with the upper power mesh 300a, to the virtual power supply point V 311, as noted above. In some embodiments, the distances of the 4 to 16 power taps 506 closest to the target node are used to determine the location of the virtual power supply point V 311.

According to Eq. 1, the effective resistance between two points is proportional to the natural log of the square of the distance between the two points. Thus, the effective resistance between a pin 504 and a reference potential, such as the power source provided by the group of power taps 506 is proportional to the logarithm the square of the distance D1 and also the logarithm of the square of the distance D2. In particular, items 8 to 13 in TABLE 1 have a high correlation with the effective resistance from a pin to a reference potential. Accordingly, items 8-13 can be used to assist in determining the effective resistance from a pin of interest to a reference potential. In some embodiments, items 8 to 13 are used as input data for machine learning which outputs an estimate of the effective resistance.

Clustering Via Kernel Density Estimation

Figures 6, 7, 8:
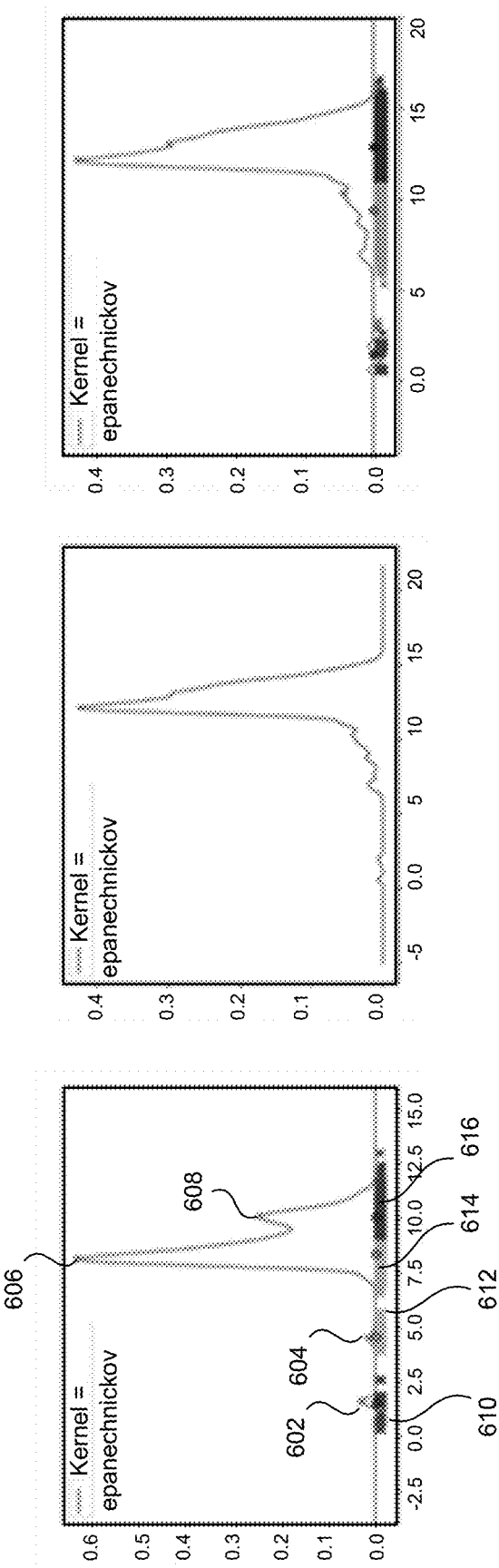
FIG. 6 and FIG. 7 show two KDEs with an "Epanechnikov" kernel.
FIG. 8 shows clustering results after a manual center input.

After all of the information (items from TABLE 1) noted above is collected, clustering (STEP 104 of FIG. 1) is performed with respect to each of the sample nodes, as follows. In some embodiments, only the minimum path resistance $R_m$ and the effective resistance $R_e$ need to be collected prior to starting the process of clustering. The ratio (i.e., $$\frac{R_m}{R_e})$$

of the minimum path resistance $R_m$ to the effective path resistance $R_e$ for each sampled node is determined. Then, an estimate is made of the distribution of the ratio using a method known as "Kernel Density Estimation" (KDE). KDE is statistical method for performing a non-parametric estimate of the probability density function of a random variable. In this case, the random variable is the ratio of the minimum path resistance to the effective path resistance. FIG. 6 and FIG. 7 show two KDEs with an "Epanechnikov" kernel (i.e., essentially a parabolic kernel function). By default, the plot shows a peak from the KDE.

Each peak can be assumed to be a center of a cluster of a different class of sample nodes. After that, sampled nodes are clustered according to the ratio value. FIG. 6 shows 4 peaks 602, 604, 606, 608 and 4 clusters 610, 612, 614, 616 of sampled PG pins of the anonymous chip. Each cluster is marked as red, green, light blue, and purple color. However, there could be many peaks from the KDE, as shown in FIG. 7. The user can enter the cluster center directly into the plot. FIG. 8 shows clustering result after the manual center input. In accordance with some embodiments, a "K means" algorithm is used for clustering. The K means algorithm is an iterative algorithm that tries to partition a dataset into K pre-defined distinct non-overlapping clusters, where each data point belongs to only one cluster. The algorithm tries to make the intra-cluster data points as similar as possible while also keeping the clusters as different (i.e., far apart) as possible.

Regression Model Training

In embodiments in which a regression model is used, the regression model is trained (STEP 106 of FIG. 1) for each resulting class obtained through clustering (STEP 104). Item 1 to item 13 are provided as the input of the regression model and the model is trained for each class. A random forest, K-nearest neighbor, linear regression model is used as regression algorithms to select the best algorithm with the best accuracy and recall scores. It takes just a few minutes to train each model while it takes over 30 min. to solve matrix to obtain effective resistance of 1,000 nodes.

Effective Resistance Estimation Via Trained Model

After the model training, we can get the predicted class quickly by putting the input values to the trained model; we can quickly obtain items 1 through 13 of Table 1 through data processing (STEP 108 of FIG. 1). Since we know the mean value and the variance of each class, it is easy to calculate estimated effective resistance from the result. Table 2 shows the accuracy and recall score of each trained model from the flow. In Table 2, chip A is an anonymous chip having the KDE as shown in FIG. 6. The result for chip B is from clustering of FIG. 7. The overall accuracy of two sample chip is 90.97% to 97.42%, and the recall score of each class is between 89.62% to 99.95%.

TABLE 2

Accuracy and Recall Score of two sample chip.

| | | Chip A | Chip B |
|---|---|---|---|
| Overall Accuracy | | 90.97% | 97.43% |
| Recall | class 0 | 99.95% | 98.44% |
| Score | class 1 | 93.88% | 90.76% |
| | class 2 | 89.62% | 98.23% |
| | class 3 | 93.20% | N.A. |

Hardware Implementation

Figure 9A:
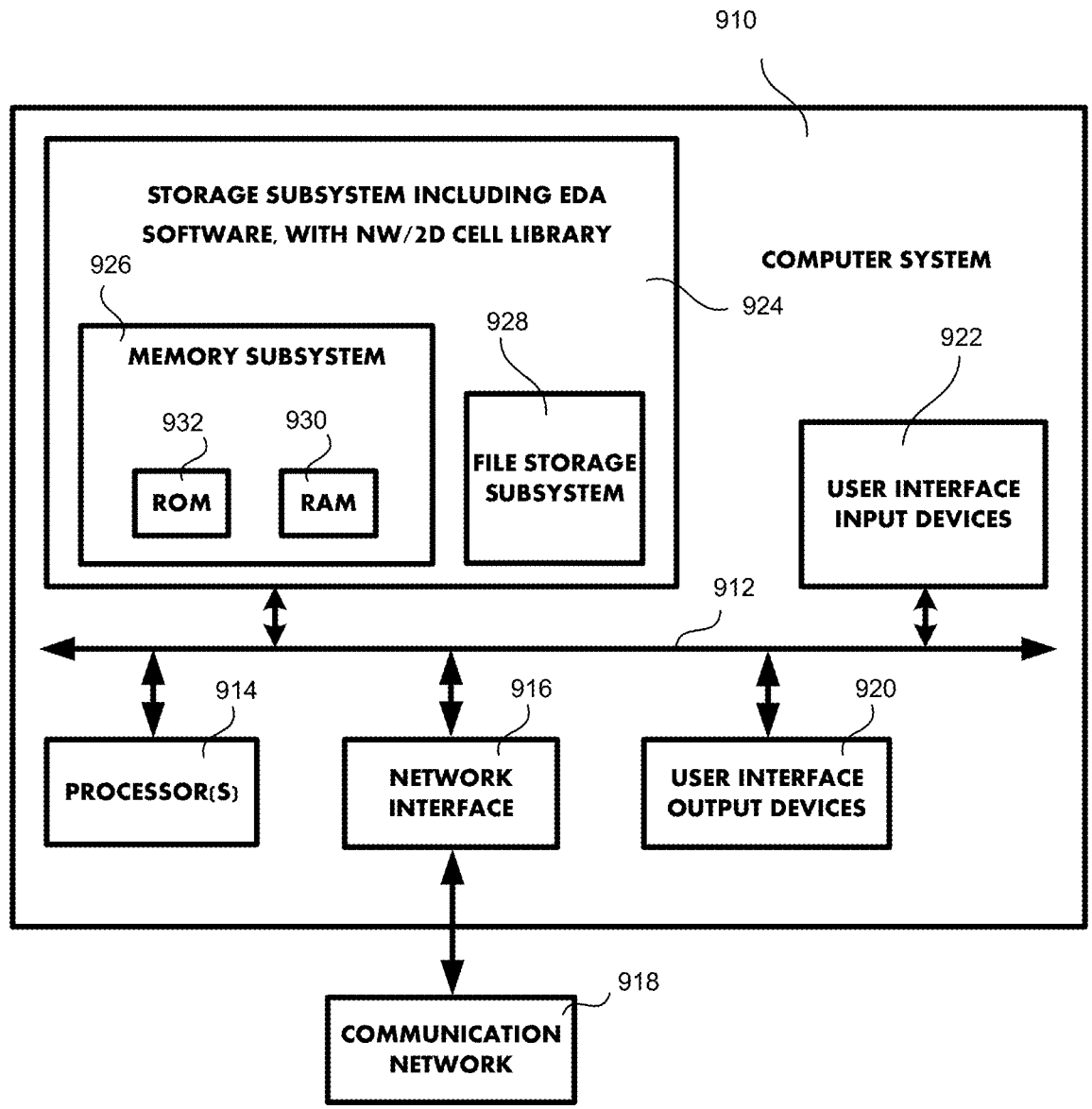
FIG. 9A is a simplified block diagrams of a computer system suitable for use with embodiments of the technology.
Figures 9B, 9C:
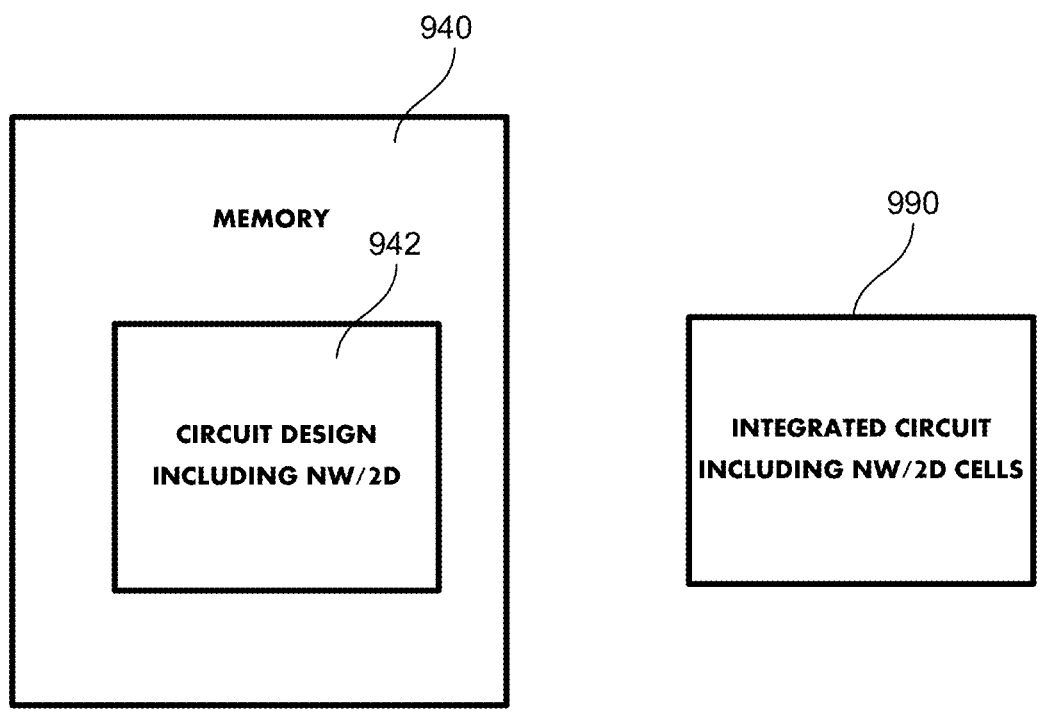
FIG. 9B illustrates a circuit design.
FIG. 9C illustrates an integrated circuit embodiment of the technology.

FIG. 9A is a simplified block diagram of a computer system suitable for use with embodiments of the technology. FIG. 9B illustrates a circuit design and FIG. 9C illustrates an IC embodiment of the technology.

In some embodiments, the computer system 910 includes at least one processing device 914, such as a computer or processor. The processing device 914 communicates with a number of peripheral devices 916, 920, 922, 926, 928 via bus subsystem 912. In some such embodiments, the processing device 914 can be, or can include a processor, a microprocessor, graphics processing unit, digital signal processor, or their electronic processing equivalents, such as an Application Specific IC ('ASIC') or Field Programmable Gate Array ('FPGA'). The term 'processor' is used herein in the broadest sense to include a singular processor and multi-core or multi-processor arrays, including graphic processing units, digital signal processors, digital processors and combinations of these devices. Furthermore, while only a single computer system or a single machine may be illustrated, the use of a singular form of such terms shall also signify any collection of computer systems or machines that individually or jointly execute instructions to perform any one or more of the sets of instructions discussed herein. Due to the ever-changing nature of computers and networks, the description of computer system 910 depicted in FIG. 9A is intended only as one example for purposes of illustrating the preferred embodiments. Many other configurations of computer system 910 are possible having more or less components than the computer system depicted in FIG. 9A.

In some embodiments, the peripheral devices include one or more of: a storage subsystem 924 comprising a memory subsystem 926 and a file storage subsystem 928; user interface input devices 922; user interface output devices 920; and a network interface subsystem 916. The user interface input devices 922 and user interface output devices 920 allow users to interact with computer system 910.

The computer system 910 may be a server computer, a client computer, a workstation, a mainframe, a personal computer (PC), a tablet PC, a set-top box (STB), a personal digital assistant (PDA), a cellular telephone, a smartphone, a web appliance, a rack-mounted 'blade', a kiosk, a television, a game station, a network router, switch or bridge, or any data processing machine capable of executing instructions (sequential or otherwise) that specify actions to be taken by that machine.

In some embodiment, the computer system 910 includes an operating system, such as Microsoft's Windows, Sun Microsystems's Solaris, Apple Computer's MacOs, Linux or Unix. In some embodiments, the computer system 910 also can include a Basic Input/Output System (BIOS) and processor firmware. In some such embodiments, the operating system BIOS and/or firmware are maintained in the storage subsystem 924. In some such embodiments, the operating system, BIOS and firmware are used by the processor 914 to control subsystems and interfaces connected to the processor 914. Typical processors compatible with these operating systems include the Pentium and Itanium from Intel, the Opteron and Athlon from Advanced Micro Devices, and the ARM processor from ARM Holdings.

Innovations, embodiments and/or examples of the claimed inventions are neither limited to conventional computer applications nor the programmable apparatus that run them. For example, the innovations, embodiments and/or examples of what is claimed can include an optical computer, quantum computer, analog computer, or the like. The computer system may be a multi-processor or multi-core system and may use or be implemented in a distributed or remote system.

Network interface subsystem 916 provides an interface to outside networks, such as an interface to communication network 918, and in some embodiments, is coupled via communication network 918 to corresponding interface devices in other computer systems or machines (not shown). In some embodiments, communication network 918 comprises many interconnected computer systems, machines and communication links not expressly shown. These communication links may be wireline links, optical links, wireless links, and/or may use any other types of devices for communication of information. Furthermore, the communication network 918 can be any suitable computer network, for example a wide area network such as the Internet, and/or a local area network, such as Ethernet. The communication network 918 can be wired and/or wireless, and in some embodiments, uses encryption and decryption methods, such as method available with a virtual private network. In some embodiments, the communication network 918 uses one or more communications interfaces, which can receive data from, and transmit data to, other systems. Some embodiments of communications interfaces include an Ethernet card, a modem (e.g., telephone, satellite, cable, or ISDN), (asynchronous) digital subscriber line (DSL) unit, Firewire interface, USB interface, and the like. In some embodiments, one or more communications protocols can be used, such as HTTP, TCP/IP, RTP/RTSP, IPX and/or UDP.

User interface input devices 922 may include an alphanumeric keyboard, a keypad, pointing devices such as a mouse, trackball, touchpad, stylus, or graphics tablet, a scanner, a touchscreen incorporated into the display, audio input devices such as voice recognition systems or microphones, eye-gaze recognition, brainwave pattern recognition, and other types of input devices. Such devices can be connected by wire or wirelessly to a computer system. In general, use of the term 'input device' is intended to include all possible types of devices and ways to input information into computer system 910 or onto communication network 918.

User interface input devices typically allow a user to select objects, icons, text and the like that appear on some types of user interface output devices, for example, a display subsystem.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide non-visual display such as via audio output or tactile output (e.g., vibrations) devices. In general, use of the term 'output device' is intended to include all possible types of devices and ways to output information from computer system 910 to the user or to another machine or computer system.

Memory subsystem 926 typically includes a number of memories including a main random-access memory ('RAM') 930 (or other volatile storage device) for storage of instructions and data during program execution and a read only memory ('ROM') 932 in which fixed instructions are stored. File storage subsystem 928 provides persistent storage for program and data files, and may include a hard disk drive, a floppy disk drive along with associated removable media, a CD-ROM drive, an optical drive, a flash memory, or removable media cartridges. The databases and modules implementing the functionality of certain embodiments may be stored by file storage subsystem 928.

Bus subsystem 912 provides a device for letting the various components and subsystems of computer system 910 communicate with each other as intended. Although bus subsystem 912 is shown schematically as a single bus, alternative embodiments of the bus subsystem may use multiple busses. For example, RAM-based main memory can communicate directly with file storage systems using Direct Memory Access ('DMA') systems.

In some embodiments, software modules can be stored within the memory subsystem 926 that cause the computer system to perform the functions noted above with regard to the methods described in this disclosed. Such software modules improve the operation of the computer system by allowing the computer system to perform improved operations in the field of manufacturing IC chips. The functions performed by the computer system functioning in accordance with such software modules is a significant improvement in the field and represents a specific implementation of the method to solve a real and important problem in the determination of design yield and in determining where bottlenecks in the timing of an IC exist, thus allowing design improvements to be made on the fly to improve the IC design yield and reduce the cost of manufacturing by reducing waste and inefficiency in the production of such ICs. In particular, issues that might arise due to an inappropriate value for the effective resistance between a particular node or group of nodes within an IC design and a reference potential, such as ground or a power source can be identified relatively quickly to allow changes to be made in the IC design to ensure that all such values of effective resistance are appropriate.

FIG. 9B depicts a memory 940 such as a non-transitory, computer readable data and information storage medium associated with file storage subsystem 928, and/or with network interface subsystem 916, and can include a data structure specifying a circuit design 942. The memory 940 can be a hard disk, a floppy disk, a CD-ROM, an optical medium, removable media cartridge, or other medium that stores computer readable data in a volatile or non-volatile form. Software read into a computer from such a memory can be converted at a selected point in time from a tangible form to a transmission signal that is propagated through a medium (such as a network, connector, wire, or trace as an electrical pulse or a medium such as space or an atmosphere as electromagnetic radiation with wavelengths in the electromagnetic spectrum longer than infrared light).

FIG. 9C illustrates an IC 990 created with the described technology that includes one or more cells selected, for example, from a cell library.

Some of the innovations, embodiments and/or examples described herein comprise and/or use a computer system, such as the computer system 910 described above. As used herein, the term 'computer system' signifies a tangible data and information processing device that physically transforms data and information, typically using sequence transformations (also referred to as 'operations'). Data and information can be physically represented by an electrical, magnetic, optical or acoustical signal that is capable of being stored, accessed, transferred, combined, compared, or otherwise manipulated by the processor. The term 'processor' can signify a singular processor and multi-core systems or multi-processor arrays, including graphic processing units, digital signal processors, digital processors or combinations of these elements.

The computer system can be electronic, for example, comprising digital logic circuitry (for example, binary logic), or analog (for example, an operational amplifier). The computer system can also be non-electronic, for example, as seen in computer systems based on optical signal processing, DNA transformations or quantum mechanics, or a combination of technologies, such as an optoelectronic computer system. For data and information structured in binary form, any computer system that can transform the data and information using the AND, OR and NOT logical operations (and their derivatives, such as the NAND, NOR, and XOR operations) can transform the data and information using any function of Boolean logic. A computer system such as an analog neural network computer system can also transform data and information non-digitally. No scientific evidence exists that any of these computer systems are processing, storing and retrieving data and information, in any manner or form equivalent to the bioelectric structure of the human brain.

The one or more computer systems may also operate to support performance of the relevant operations in a 'cloud computing' environment or as a 'software as a service' (SaaS). For example, at least some of the operations may be performed by a group of computer systems available at a distributed or remote system, these computer systems accessible via a communications network (e.g., the Internet) and via one or more software interfaces (e.g., an application program interface (API).)

As used herein, the term 'module' signifies a tangible data and information processing device, that typically is limited in size and/or complexity. For example, the term 'module' can signify one or more methods or procedures that can transform data and information. The term 'module' can also signify a combination of one or more methods and procedures in a computer program. The term 'module' can also signify a small network of digital logic devices, in which interconnections of the logic devices give structure to the network. Methods and procedures comprising a module, specified in a specialized language, such as System C, can be used to generate a specification for a network of digital logic devices that process data and information with exactly the same results as are obtained from the methods and procedures.

A module can be permanently configured (e.g., hardwired to form hardware), temporarily configured (e.g., programmed with software), or a combination of the two configurations (for example, a structured ASIC). Permanently configured modules can be manufactured, for example, using Application Specific ICs (ASICs) such as Arithmetic Logic Units (ALUs), Programmable Logic Arrays (PLAs), or Read Only Memories (ROMs), all of which are typically configured during manufacturing. Temporarily configured modules can be manufactured, for example, using Field Programmable Gate Arrays (FPGAs—for example, sold by Xilink or Intel's Altera), Random Access Memories (RAMs) or microprocessors. A module is configured to process data and information, typically using a sequence of transformations (also referred to as 'operations') applied to the data and information (or in the case of ROMs and RAMS, transforming data and information by using the input information as an address for memory that stores output data and information), to perform aspects of the present innovations, embodiments and/or examples of the invention.

Modules that are temporarily configured need not be configured at any one point in time. For example, a computer system comprising one or more modules can have the modules configured at different times. The computer system can comprise a set of one or more modules at one point of time, and to comprise a different set of one or modules at a different point of time. The decision to manufacture or implement a module in a permanently configured form, a temporarily configured form, or a combination of the two forms, may be driven by cost, time considerations, engineering constraints and/or specific design goals. The 'substance' of a module's processing is independent of the form in which it is manufactured or implemented.

As used herein, the term 'algorithm' signifies a process comprising a sequence or set of operations or instructions that a module can use to transform data and information to achieve a result. A module can comprise one or more algorithms. As used herein, the term 'thread' refers to a sequence of instructions that can comprise a subset of the instructions of an entire process or algorithm. A process or algorithm can be partitioned into multiple threads that can be executed in parallel.

As used herein, the term 'computer' includes at least one information processor that, for example, can perform certain operations such as (but not limited to) the AND, OR and NOT logical operations using electronic gates that can comprise transistors, with the addition of memory (for example, memory based on flip-flops using the NOT-AND or NOT-OR operation). Such a processor is said to be Turing-complete or computationally universal. A computer, whether or not it is a digital computer, typically comprises many modules.

As used herein, the term 'software' or 'program' signifies one or more algorithms and data structures that configure a computer system for use in the innovations, embodiments and examples described in this specification. Such devices configurable by software include one or more computers, for example, standalone, client or server computers, or one or more hardware modules, or systems of one or more such computers or modules. As used herein, the term 'software application' signifies a set of data and instructions that configure the computer system to achieve a specific result, for example, to perform word processing operations, or to encrypt a set of data.

As used herein, the term 'programming language' signifies a grammar and syntax for specifying sets of instruction and data that comprise software. Programming languages include assembler instructions, instruction-set-architecture (ISA) instructions, machine instructions, machine dependent instructions, microcode, firmware instructions, state-setting data, or either source code or object code written in any combination of one or more higher level languages, such as conventional procedural programming languages, for example, the C programming language or similar programming languages (such as SystemC), or object oriented programming language such as Smalltalk, C++ or the like, and any future equivalent programming languages.

Software is transferred into, entered into, equivalently, read into, one more memories of the computer or computer system from a data and information storage device. The computer typically has a device for reading storage media that is used to transport the software or has an interface device that receives the software over a network. This process is discussed in the General Computer Explanation section.

The invention recited in the claims appended hereto may be implemented by the computer system 910 to perform functions of a design and manufacture process (DMP) to create an item of manufacture. The DMP may include an Electronic Design Automation (EDA) process. In such a DMP, information for a product idea is supplied by a designer. The information is transformed by the DMP to create the item of manufacture.

In some embodiments, the DMP 1000 uses an EDA software tool 1012 (which in some embodiments is EDA software) as a design tool, or a verification tool. When the design is finalized, it can be taped-out 1034, which typically is when artwork (e.g., geometric patterns) for the IC is sent to a fabrication facility to manufacture the mask set, which is then used to manufacture the IC. After tape-out, a semiconductor die is fabricated 1036 and packaging and assembly processes 1038 are performed, which result in the finished IC 1040 which may also be signified herein as a circuit, device, component, chip or SoC (System on Chip).

Items of manufacture, such as circuits or systems produced by the DMP are used in commerce at a variety of levels of abstraction ranging from low-level transistor layouts to high-level description languages. Most designers start at high-level of abstraction to design their circuits and systems, using a hardware description language ('HDL') such as VHDL, Verilog, SystemVerilog, SystemC, MyHDL or OpenVera. The high-level HDL is easier for developers to comprehend, especially for a vast system, and may describe highly complex concepts that are difficult to grasp using a lower level of abstraction. The HDL description may be converted into other levels of abstraction as is helpful to the developers. For example, a high-level description may be converted to a logic-level register transfer level ('RTL') description, a gate-level description, a layout-level description, or a mask-level description. Each lower abstraction level introduces more detail into the design description. The lower-levels of abstraction may be generated automatically by computer, derived from a design library, or created by another design automation technique. An example of a specification language at a lower level of abstraction is SPICE, which is much used for detailed descriptions of analog-based circuits.

Figure 10:
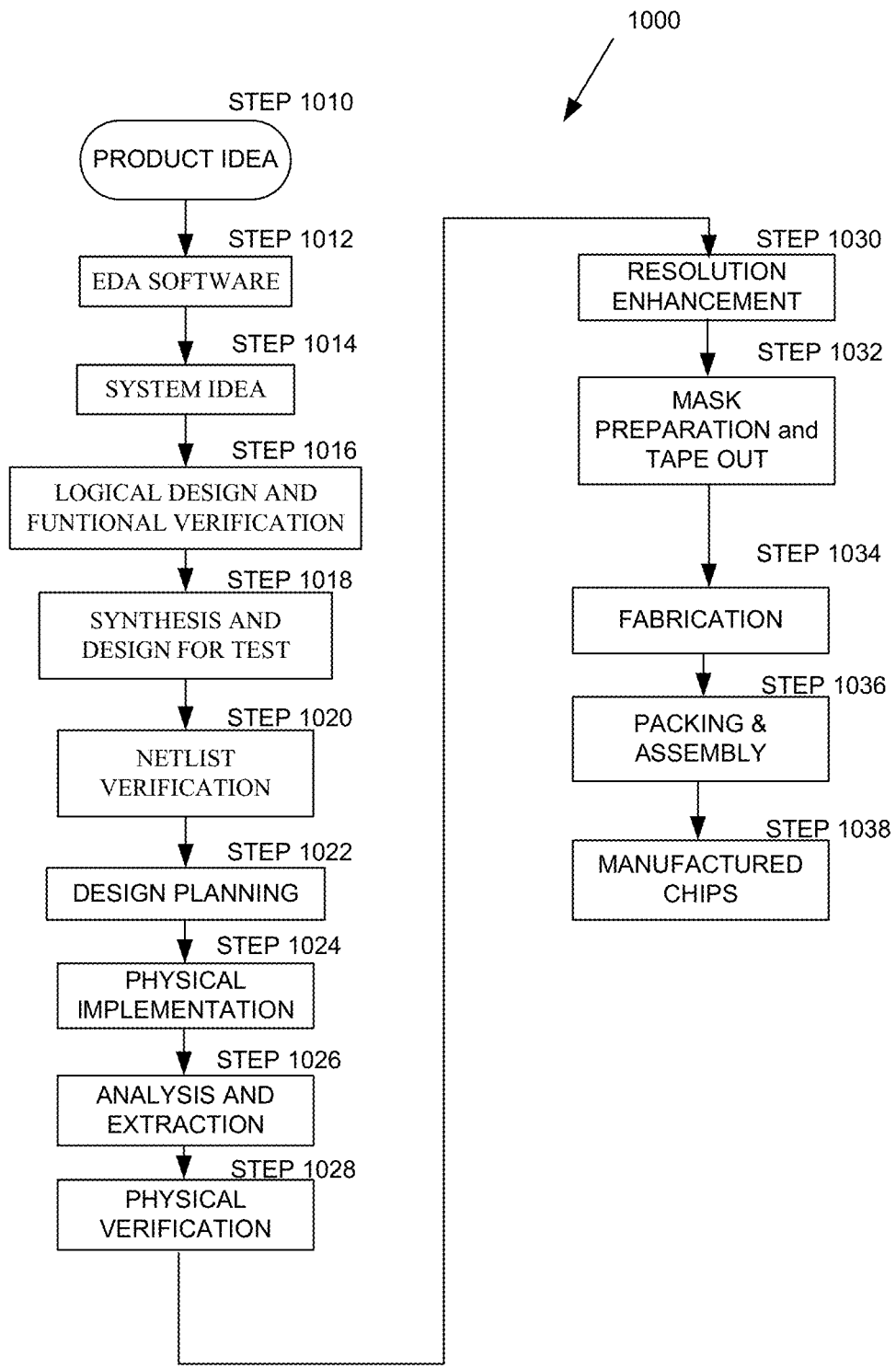
FIG. 10 illustrates one example of a design and manufacture process performed in the design, verification and fabrication of an item of manufacture.

FIG. 10 illustrates one example of a DMP 1000 performed in the design, verification and fabrication of an item of manufacture, such as an IC, using software tools with a computer system, such as the computer system 910, and possibly special hardware-assisted tools not expressly shown herein, to transform and verify design data and instructions that represent the design of the IC. The DMP disclosed with respect to FIG. 10 is for illustration purposes only and is not meant to limit the present disclosure. For example, in some embodiments of the disclosed method and apparatus, the DMP may require a designer to perform the design operations in a different sequence than the sequence described herein.

The example DMP 1000 starts with the creation of a product idea (STEP 1010). In some embodiments, the DMP 1000 implements an EDA software tool 1012. During system design 1014, a designer uses the EDA tool to assist in describing the functionality to be manufactured. The designer can also perform what-if planning to refine the functionality and to check costs, etc. Hardware-software architecture partitioning can occur at this stage. Examples of EDA software products from Synopsys, Inc. of Mountain View, California that can be used at this stage include: Model Architect, Saber, System Studio, and Designware products.

Next, a logic design and functional verification is performed (STEP 1016). During logic design and functional verification, modules in the circuit are specified in one or more hardware description languages, or HDLs. In addition, the design is checked for functional accuracy. That is, the design is checked to match the requirements of the specification of the circuit or system being designed to ensure that the design produces the correct outputs. Examples of HDL languages include: Verilog, VHDL and SystemC. Functional verification is typically done by using software-based simulators and other tools such as testbench generators, static HDL checking tools and formal verification tools. In some situations, special hardware referred to as 'emulators' or 'prototyping systems' are used to speed up the functional verification. Examples of EDA software products that can be used at this stage include: VCS, Vera, Designware, Magellan, Formality, ESP and Leda products, each from Synopsys, Inc. of Mountain View, California. Examples of emulator and prototyping products also available from Synopsys that can be used at this state include: Zebu® and Protolink® (® signifies 'Registered Trademark').

The next step requires synthesis and design for test (STEP 1018). During synthesis and design for test, HDL code is translated to a netlist. The netlist can be optimized for the target technology. Additionally, tests can be designed and implemented to check the finished IC. Examples of EDA software products that can be used at this stage include: Design Compiler, Physical Compiler, Test Compiler, Power Compiler, FPGA Compiler, Tetramax, and Designware products, each from Synopsys, Inc. of Mountain View, California.

Following the synthesis and design for test, the netlist is verified (STEP 1020). During netlist verification, the netlist is checked for compliance with timing constraints and for correspondence with the HDL code. Examples of EDA software products that can be used at this stage include: Formality, Primetime, and VCS products, each from Synopsys, Inc. of Mountain View, California.

Next, design planning is performed (STEP 1022). During design planning, an overall floor plan for the IC is constructed and analyzed for timing and top-level routing. Examples of EDA software products that can be used at this stage include: Astro and IC Compiler products, each from Synopsys, Inc. of Mountain View, California.

Following design planning, a layout is implemented (STEP 1024). During layout implementation, the physical placement (positioning of circuit elements such as transistors or capacitors) and routing (connection of the same by a plurality of conductors) occurs, as can selection of library cells to perform specific logic functions. Examples of EDA software products that can be used at this stage include: the Astro and IC Compiler products, each from Synopsys, Inc. of Mountain View, California.

Once the layout implementation is complete, an analysis and extraction is performed (STEP 1026). During analysis and extraction, the circuit function is verified at the layout level, which permits refinement of the layout design. Examples of EDA software products that can be used at this stage include: Astrorail, Primerail, Primetime, and Star RC/XT products, each from Synopsys, Inc. of Mountain View, California.

Next, the physical layout is verified (STEP 1028). During physical verification, the layout design is checked to ensure correctness for manufacturing constraints such as design rule constraints, electrical constraints, lithographic constraints, and circuitry function matching the HDL design specification. An example of an EDA software product that can be used at this stage includes the Hercules product from Synopsys, Inc. of Mountain View, California.

Next, enhancements to the resolution of the layout are done (STEP 1030). During resolution enhancement, geometric manipulations of the layout are performed to improve manufacturability of the design. An example of an EDA software product that can be used at this stage is the Proteus product from Synopsys, Inc. of Mountain View, California.

During one or more of design planning, physical implementation, analysis and extraction, physical verification, and resolution enhancement, the method and apparatus for determining and optimizing design yield, such as disclosed above in FIG. 4, may be performed as a part of one or more of these steps.

Next, the masks are prepared and the design is "taped out" (STEP 1032). Data is created to be used (after lithographic enhancements are applied, if appropriate) for production of lithography masks. Tape-out data is used to produce the lithography masks that are used to produce finished ICs. Examples of EDA software products that can be used at this stage include the CATS family of products from Synopsys, Inc. of Mountain View, California. In addition, Examples of EDA software products that can be used during tape-out include the IC Compiler and Custom Designer families of products from Synopsys, Inc. of Mountain View, California.

The IC design tools noted above are merely examples of tools that can be used. Similar commercial tools and various non-commercial tools from other EDA vendors (such as Cadence, Siemens), other corporate entities, universities, or open source repositories, can be used as an alternative.

A storage subsystem is preferably used to store the programs and data structures that provide the functionality of some or all of the EDA tools described herein, and tools applied for development of cells for the library and for physical and logical design using the library. These programs and data structures are generally executed by one or more processors in a manner known to those of ordinary skill in the art.

In accordance with some embodiments of the disclosed method and apparatus, an EDA process, such as the EDA process disclosed with respect to the DMP 1000 of FIG. 10, typically includes an emulator to verify the functionality of a circuit design. For example, in the DMP 1000 noted above with respect to FIG. 10, examples of an emulator and prototyping product available from Synopsys that can be used to assist in logical design functional verification (STEP 1012) include: Zebu® and Protolink® (® signifies 'Registered Trademark').

Figure 11:
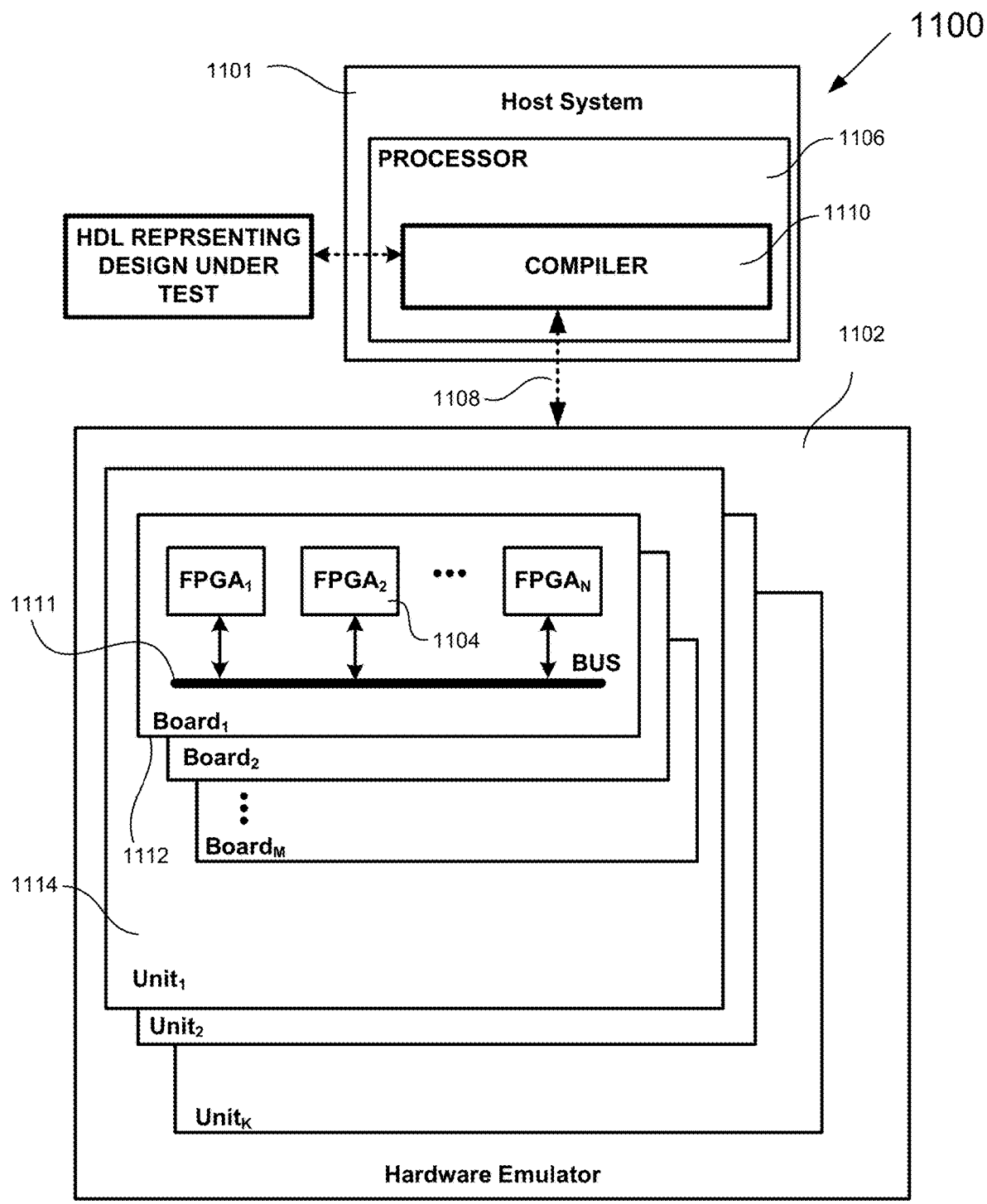
FIG. 11 illustrates additional details with regard to an implementation of one example of a design platform that includes a host system and an emulator.

FIG. 11 illustrates additional details with regard to an implementation of one example of a design platform 1100 that includes a host system 1101 and an emulator 1102. In some embodiments, the emulator 1102 is a set of programmable devices, such as FPGAs 1104. In some such embodiments, the host system 1101 generates data and information using a compiler 1110 to configure the emulator 1102 to emulate a circuit design. One of more circuit designs to be emulated are referred to as a Design Under Test ('DUT'). The emulator 1102 is a hardware system that emulates a DUT. That is, the emulator 1102 is used the emulation the performance of the DUT to verify the functionality of the DUT. One example of a product that can be used as the emulator 1102 for the embodiments disclosed herein is the ZeBu Server available from Synopsys, Inc.

The host system 1101 comprises one or more processors 1106. In the embodiment where the host system 1101 is comprised of multiple processors 1106, the functions described herein as being performed by the host system 1101 may be distributed among the multiple processors 1106.

In some embodiments, at least one of the processor 1106 within the host system 1101 includes a compiler 1110 that processes code written in a hardware description language that represents the DUT being emulated by the emulator 1102. The compiler produces data (typically binary) and information that is used to configure the emulator 1102 to emulate the DUT. The compiler 1110 may transform, change, reconfigure, add new functions to, and/or control the timing of the DUT.

The host system 1101 and emulator 1102 exchange data and information using signals carried by an emulation connection 1108. The connection 1108 can be one or more electrical cables, for example, cables with pin configurations compatible with the RS232 or USB protocols. The connection 1108 can be a wired communication medium or network, such as a local area network, or a wide area network such as the Internet. The connection can be a wireless communication medium or a network with one or more points of access, using a wireless protocol, such as Bluetooth® or IEEE 802.11. The host system 1101 and emulator 1102 can exchange data and information through a third device, such as a network server (not shown).

In some embodiments, the emulator 1102 includes a plurality of FPGAs 1104. In some such embodiments, each FPGA 1104 interfaces through a bus 1111 to other FPGAs 1104 of the emulator 1102 (and potentially other emulator hardware components) in order for the FPGAs 1104 to exchange signals. While some embodiments disclosed herein use emulators comprising FPGAs, other embodiments can include other types of logic blocks instead of, or along with, the FPGAs 1104 for emulating DUTs. For example, some embodiments may use custom FPGAs, specialized ASICs for emulation or prototyping, memories, and input/output devices.

The FPGAs 1104 may reside on one or more hardware boards 1112. Several boards 1112 may be placed into a hardware unit 1114. The boards 1112 within each unit 1114 may be connected to one another by cables or any other means to form a multi-unit emulator 1102. In some embodiments, the emulator 1102 comprises a single board 1112, a single unit 1114 with one or more boards 1112, or with multiple units 1114, each with one or more boards 1112, each board 1112 with one or more units without departing from the teachings of the present disclosure.

For a DUT that is to be emulated, the emulator 1102 receives from the host system 1101 one or more "bit files". The bit files include a description of the DUT. The bit files further specify partitions of the DUT created by the host system 1101, with: (1) trace and injection logic, (2) mappings of the partitions to the FPGAs of the emulator 1102, and (3) design constraints. Based on the bit files, the emulator 1102 configures the FPGAs 1104 to perform the functions of the emulated DUT. With some emulators 1102, one or more FPGAs 1104 of the emulator 1102 already have trace and injection logic built into the silicon of the FPGA 1104. For this type of emulator 1102, the FPGAs 1104 do not have to be configured by the host system 1101 to emulate trace and injection logic.

The host system 1101 receives (e.g., from a user or from a data store) a description of a DUT that is to be emulated. In one embodiment, the DUT description is in a hardware description language (HDL), such as register transfer language (RTL). In another embodiment, the DUT description is in netlist level files, or a mix of netlist level files and HDL files. If part of the DUT description or the entire DUT description is in a HDL, the host system 1101 synthesizes the DUT description to create a gate level netlist based on the DUT description. A host system 1101 can use the netlist of the DUT to partition the DUT into multiple partitions, with some of these partitions including trace and injection logic. The trace and injection logic traces interface signals exchanged via the interfaces of an FPGA. Additionally, the trace and injection logic can be used to inject traced interface signals into the logic of the FPGA. The host system 1101 maps each partition to an FPGA of the emulator 1102. With some emulators, the trace and injection logic is only included in select partitions for a group of FPGAs. The trace and injection logic can be built into one or more of the FPGAs of an emulator 1102. The host system 1101 can synthesize multiplexers to be mapped into the FPGAs. The multiplexers can be used by the trace and injection logic to inject interface signals into the DUT logic.

The host system 1101 creates bit files describing each partition of the DUT and the mapping of the partitions to the FPGAs. For partitions in which trace and injection logic was incorporated, the bit files also describe the incorporation of the logic. The bit files may also include place and route information and design constraints. The host system 1101 stores the bit files and also stores for components of the DUT information describing which FPGAs are to emulate each component of the DUT (to which FPGAs each component is mapped).

Upon request, the host system 1101 transmits the bit files to the emulator 1102. The host system 1101 instructs the emulator 1102 to emulate the DUT. During emulation of the DUT or at the end of the emulation, the host system 1101 receives emulation results from the emulator 1102 through the emulation connection 1108. Emulation results are data and information generated by the emulator 1102 based on the emulation of the DUT. The emulation results include interface signals (states of interface signals) traced by the trace and injection logic of each FPGA. The host system 1101 can stores the emulation results, or transmit them to another processing system.

After emulation of the DUT, a user may request to debug a component of the DUT. If such a request is made the user may provide a time period of the emulation to debug. The host system 1101 identifies which FPGAs are configured to emulate the component based on the stored information. The host system 1101 retrieves stored interface signals associated with the time period and traced by the trace and injection logic of each identified FPGA. The host system 1101 instructs the emulator 1102 to re-emulate the identified FPGAs, either one by one, multiple at a time, or altogether. The host system 1101 transmits the retrieved interface signals to the emulator 1102 in order to re-emulate the component for the time period. The trace and injection logic of each identified FPGA injects its respective interface signals received from the host system 1101 into the logic of the DUT mapped to the FPGA. In case of multiple re-emulations of an FPGA, the results may be merged all together to have a full debug view.

The host system 1101 receives from the emulator signals traced by logic of the identified FPGAs during the re-emulation of the component. The host system 1101 stores the signals received from the emulator 1102. The signals traced during the re-emulation can have a higher sampling rate than during the initial emulation. For example, in the initial run a traced signal may be comprised of a saved hardware state every X milliseconds. However, in the re-emulation the traced signal may be comprised of a saved hardware state every Y milliseconds, where Y is less than X. If the user requests to view a waveform of a signal traced during the re-emulation, the host system 1101 can retrieve the stored signal and display a plot of the signal (generates a waveform of the signal). Afterwards the user can, for example, request to re-emulate the same component but for a different time period or to re-emulate another component.

A host system 1101 typically comprises at least seven sub-systems: a design synthesizer, a mapping module, a run time module, a results module, a debug module, a waveform module, and a storage module. Each of these sub-systems may be embodied as hardware, software, firmware, or a combination thereof. Together these components configure the emulator 1102, and monitor the emulation results.

The design synthesizer converts the HDL of a DUT into gate level logic. For a DUT that is to be emulated, the design synthesizer receives a description of the DUT. If the description of the DUT is fully or partially in HDL (e.g., RTL or other level of abstraction), the design synthesizer 210 synthesizes the HDL of the DUT to create a gate-level netlist with a description of the DUT in terms of gate level logic.

The mapping module partitions DUTs and maps partitions to emulator FPGAs. The mapping module partitions a DUT at the gate level into a number of partitions using the netlist of the DUT. For each partition, the mapping module retrieves a gate level description of the trace and injection logic and incorporates the logic into the partition. As described above, the trace and injection logic included in a partition is configured to trace signals exchanged via the interfaces of an FPGA to which the partition is mapped (trace interface signals). The trace and injection logic can be incorporated into the DUT prior to the partitioning. For example, the trace and injection logic may be incorporated by the design synthesizer prior to or after the synthesizing the HDL of the DUT. Hence, the trace and injection logic may not match the partitions, it may be a subset, a superset or even different from the partitions.

In addition to including the trace and injection logic, the mapping module may include additional tracing logic in a partition in order to trace the states of certain DUT components that are not traced by the trace and injection logic (to trace signals other than the interface signals traced by the trace and injection logic). The mapping module may include the additional tracing logic in the DUT prior to the partitioning or in partitions after the partitioning. The design synthesizer can include the additional tracing logic in an HDL description of the DUT prior to synthesizing the description.

The mapping module maps each partition of the DUT to an FPGA of the emulator 1102. The mapping module performs the partitioning and mapping using design rules, design constraints (e.g., timing or logic constraints), and information about the emulator 1102. For components of the DUT, the mapping module stores information in the storage module describing which FPGAs are to emulate each component.

Based on the partitioning and the mapping, the mapping module generates one or more bit files that describe the created partitions and the mapping of logic to each FPGA of the emulator 1102. The bit files may include additional information, such as constraints of the DUT, and routing information of connections between FPGAs and connections within each FPGA. The mapping module can generate a bit file for each partition of the DUT, which can be stored in the storage module. Upon request from a user, the mapping module transmits the bit files to the emulator 1102, which the emulator 1102 uses to configure the FPGAs to emulate the DUT.

If the emulator 1102 includes specialized ASICs that include the trace and injection logic, the mapping module may generate a specific configuration allowing to connect them to the DUT or just save the information of what traced/injected signal is and where the information is stored on the specialized ASIC.

The run time module controls emulations performed on the emulator 1102. The run time module may cause the emulator 1102 to start or stop executing an emulation. Additionally, the run time module may provide input signals/data to the emulator 1102. The input signals may be provided directly to the emulator 1102 through the connection or indirectly through other input signal devices. For example, the host system 1101 with the run time module may control an input signal device to provide the input signals to the emulator 1102. The input signal device may be, for example, a test board (directly or through cables), signal generator, another emulator (not shown), or another host system (not shown).

The results module processes emulation results generated by the emulator 1102. During emulation and/or after completing the emulation, the results module receives emulation results from the emulator 1102 generated during the emulation. The emulation results include signals traced during the emulation. Specifically, the emulation results include interface signals traced by the trace and injection logic emulated by each FPGA. The emulation results may also include signals traced by additional logic included in the DUT. Each traced signal can span multiple cycles of the emulation. A traced signal is comprised of multiple hardware states and each hardware state is associated with a time of the emulation. The results module stores the traced signals received in the storage module. For each stored signal, the results module can store information indicating which FPGA generated the traced signal.

The debug module allows users to debug DUT components. After the emulator 1102 has emulated a DUT and the results module has received the interface signals traced by the trace and injection logic during the emulation, a user may request to debug a component of the DUT by re-emulating the component for a specific time period. In a request to debug a component, the user identifies the component and indicates a time period of the emulation to debug. The user's request can also include a sampling rate that indicates how often hardware states should be saved by logic that traces signals.

The debug module identifies the one or more FPGAs of the emulator 1102 that are configured to emulate the component based on the information stored by the mapping module in the storage module. For each identified FPGA, the debug module retrieves, from the storage module, interface signals traced by the trace and injection logic of the FPGA during the time period indicated by the user (i.e., retrieve hardware states traced by the trace and injection logic that are associated with the time period).

The debug module transmits the retrieved interface signals to the emulator 1102. The debug module instructs the debug module to run the identified FPGAs and for the trace and injection logic of each identified FPGA to inject its respective traced signals into logic of the FPGA in order to re-emulate the component for the requested time period. The debug module can also transmit the sampling rate provided by the user to the emulator 1102 so that the tracing logic traces hardware states at the proper intervals. To debug the component, the emulator 1102 only has to run the FPGAs to which the component has been mapped. Additionally, the re-emulation of the component does not have to start from the beginning but can start at any point desired by the user.

For an identified FPGA, the debug module can transmit instructions to the emulator 1102 to load multiple emulator FPGAs with the same configuration of the identified FPGA. The debug module additionally instructs the emulator 1102 to run the multiple FPGAs in parallel. Each FPGA from the multiple FPGAs is run with a different time window of the interface signals in order to generate a larger time window in a shorter amount of time. For example, for the identified FPGA to run a certain amount of cycles it may take an hour. However, if multiple FPGAs are loaded with the configuration of the identified FPGA and each of the FPGAs runs a subset of the cycles, it may only take a few minutes for the FPGAs to collectively run all of the cycles.

A user may identify a hierarchy or a list of DUT signals to re-emulate. To enable this, the debug module determines the FPGA needed to emulate the hierarchy or list of signals, retrieves the necessary interface signals and transmits the retrieved interface signals to the emulator 1102 for re-emulation. Hence, a user can identify any element (e.g., component or signal) of the DUT to debug/re-emulate.

The waveform module generates waveforms based on traced signals. If a user requests to view a waveform of a signal traced during an emulation run, the host system 1101 retrieves the signal from the storage module. The waveform module displays a plot of the signal to the user. For one or more signals, when the signals are received from the emulator 1102, the waveform module can automatically generate the plots of the signals.

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for estimating/predicting effective resistance between points within an integrated circuit design, the method comprising:
   a) determining ratios of a minimum path resistance to an effective path resistance;
   b) clustering the ratios into classes using kernel density estimation;
   c) training a plurality of regression models for the resulting classes, wherein the regression models include a random forest regression model, a K-nearest neighbor regression model and a linear regression model; and
   d) using the random forest regression model, the K-nearest neighbor regression model, and the linear regression model to select which of the random forest regression model, the K-nearest neighbor regression model, and the linear regression model is best with regard to accuracy and recall scores.

2. A method for estimating effective resistance between points within an integrated circuit design, the method comprising:
   a) receiving sample data for a set of sample nodes, the sample data comprising information that is statistically relevant to the effective resistance between each of the sample nodes and at least one reference potential tap;
   b) using at least a portion of the sample data to determine the ratios of effective resistance with respect to minimum path resistance for each sample node of the set of sample nodes, cluster the ratios and identify clusters of nodes in the course of clustering the ratios;
   c) classifying sample nodes based on sample nodes having membership in a particular cluster;
   d) forming a model based on indicia that indicates that a particular node belongs to a particular class; and
   e) using the model to classify other nodes by applying data associated with the other nodes to the model.

3. The method of claim 2, wherein the reference potential tap is a ground potential tap.

4. The method of claim 2, wherein the reference potential tap is a power supply tap point.

5. The method of claim 2, wherein identifying clusters of nodes includes determining that all nodes of a cluster have at least one characteristic that falls within a predetermined range.

6. The method of claim 5, wherein at least one of the characteristics is a ratio of effective resistance of a particular node to minimum path resistance for that particular node.

7. The method of claim 6, wherein the minimum path resistance of a particular node is an upper bound on the effective resistance of that particular node to the reference potential tap.

8. The method of claim 2, further including estimating the effective resistance of a particular node that is not one of the sample nodes, based on the indicia associated with the particular node indicating that the particular node is in a particular class and further based on an estimate of the effective resistance of the sample nodes within the class indicated by the indicia.

9. Method of claim 8, wherein the indicia includes a power net name associated with the particular node.

10. The method of claim 8, wherein the indicia includes information related to a power net within a specific area.

11. The method of claim 8, wherein the indicia includes an estimation of the complexity of paths between the particular node and a reference potential tap.

12. The method of claim 11, wherein the estimate of the complexity is determined at least in part based on how many conductors are connected to a reference potential tap and that reside at a set distance from the particular node.

13. The method of claim 11, wherein the estimate of the complexity is determined at least in part based on how many same power net vias reside within a set distance of the particular node.

14. The method of claim 11, wherein the estimate of the complexity is determined at least in part based on whether the particular node belongs to a boundary cell.

15. The method of claim 11, wherein the estimate of the complexity is determined at least in part based on how far the particular node is to from the nearest via that connects to an upper metal layer.

16. Method of claim 11, wherein the estimate of the complexity is determined at least in part based on how many vias connect the particular node to an upper metal layer on a same rail.

17. The method of claim 11, wherein the estimate of the complexity is determined at least in part based on a minimum path resistance between the particular node and a reference potential tap.

18. The method of claim 11, wherein the estimate of the complexity is determined at least in part based on a logarithm of a square of a distance D2 from a virtual power supply point to the particular node.

19. The method of claim 18, wherein the estimate of the complexity is determined at least in part based on a sum of a logarithm of a square of a distance D1 from a point located between a plurality of power taps associated with an upper power mesh, the power taps being located within a set distance of the particular node.

20. The method of claim 11, wherein the estimate of the complexity is determined at least in part based on a ratio of a resistance of a minimum resistance path with respect to a logarithm of a sum of a square of a distance D1 and a square of a distance D2, wherein the distance D1 is from a point located between a plurality of power taps associated with an upper power mesh, the power taps being located within a set distance of the particular node and the distance D2 is from a virtual power supply point to the particular node.

* * * * *